(No Model.) 2 Sheets—Sheet 1.

W. COLE, Jr.
AXLE LUBRICATOR.

No. 302,894. Patented Aug. 5, 1884.

Witnesses:
J. H. Blackwood
W. H. Doolittle

Inventor.
Warren Cole, Jr.
by R. G. DuBois,
Attorney.

(No Model.) 2 Sheets—Sheet 2.
W. COLE, Jr.
AXLE LUBRICATOR.
No. 302,894. Patented Aug. 5, 1884.
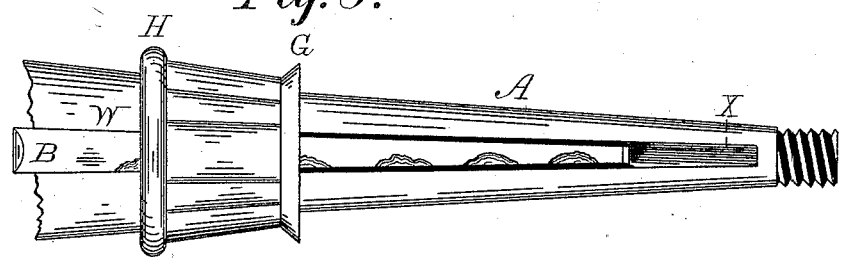
Fig. 5.
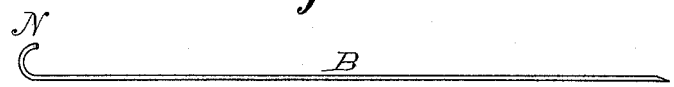
Fig. 6.
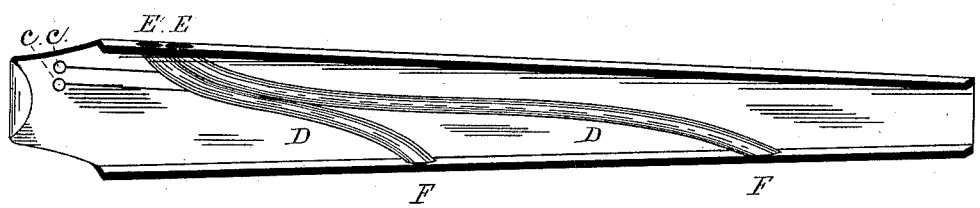
Fig. 7.
Fig. 9.
Fig. 10.
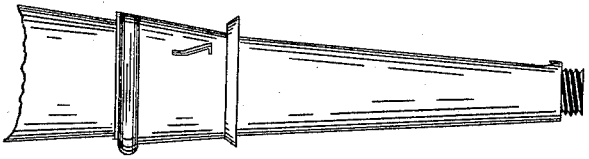
Witnesses:
J. H. Blackwood
W. H. Doolittle
Inventor
Warren Cole, Jr.
by R. G. DuBois
Attorney
N. PETERS, Photo-Lithographer, Washington, D. C.

UNITED STATES PATENT OFFICE.

WARREN COLE, JR., OF KEOKUK, IOWA.

AXLE-LUBRICATOR.

SPECIFICATION forming part of Letters Patent No. 302,894, dated August 5, 1884.

Application filed April 8, 1884. (No model.)

*To all whom it may concern:*

Be it known that I, WARREN COLE, Jr., a citizen of the United States, residing at Keokuk, in the county of Lee and State of Iowa, have invented certain new and useful Improvements in Axle-Lubricators; and I do hereby declare the following to be a full, clear, and exact description of the invention, such as will enable others skilled in the art to which it appertains to make and use the same.

The principal features of my invention consist in a simple and easy means of applying hard or soft grease to the spindle of an axle for lubricating purposes, as illustrated in the accompanying drawings, in which—

Figure 1:
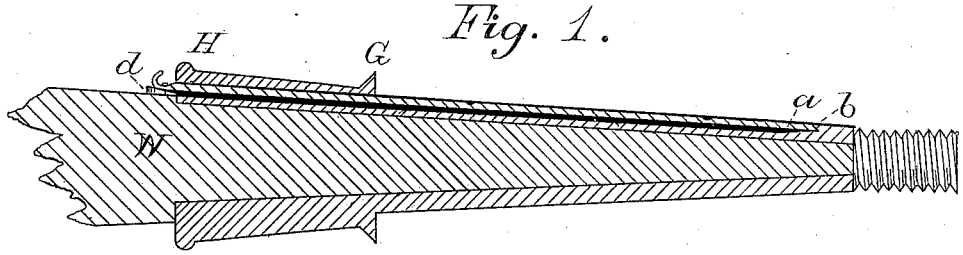
Figure 2:
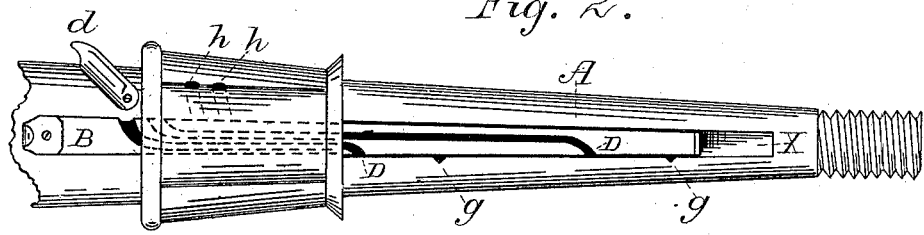
Figure 3:
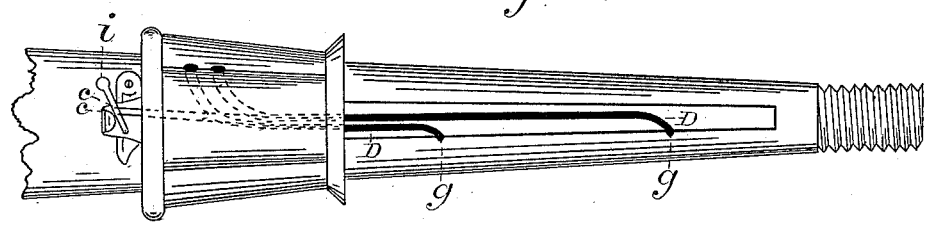
Figure 4:
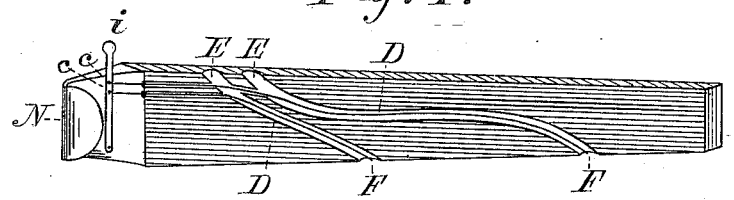
Figure 8:
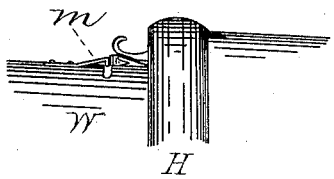

Figure 1 is a sectional view; Fig. 2, a side view showing the slide partly removed; Fig. 3, a side view showing the slide in place; Fig. 4, a perspective view of the slide when removed from the slot, showing chiseled ducts containing probes; Fig. 5, a side view of slide loaded with hard lubricating material entering the slot in axle-spindle; Fig. 6, a view of a thin slide for hard grease, such as shown, loaded and entering the slot; Fig. 7, a slide made of thin material, having flanged edges and ducts fastened on the inside, which are provided with probes; Fig. 8, a spring to prevent the wedge from jarring loose; Fig. 9, a hard-grease slide corresponding in shape to the slot shown in the succeeding figure; Fig. 10, a slot made on the outside of shoulder-band.

Like letters indicate like parts in the several figures.

A represents the cast-iron axle-spindle, made to fit over a wood axle, W, and is provided with a shoulder-band, H, having a shoulder, G.

In the spindle A, I make a slot, X, in the front end of which is an inclined plane, a, to raise the end of the slide flush with the periphery of the spindle when the slide is shoved into place. The bevel-angle b prevents the slide B from being shoved out beyond the periphery of the spindle. The slot is made approximately wedge-shaped, narrowing as it extends outward toward the nut end of the spindle, and for convenience is made in the side, entering at the shoulder end, passing through the shoulder-band and along the spindle nearly to the screw-thread on end of axle.

In order to allow the slide to pass freely into the opening when loaded with grease, I make the slot deeper than the slide is thick. The casting which covers over the slot preserves strength, and, combined with the outer covering, keeps dirt out of slot and wheel.

To prevent the slot weakening the axle the same thickness of iron can be preserved under it as on other corresponding parts, while the extra iron in the corners more than compensates for wood taken out of the axle W.

For a hard-grease slide I sometimes make the slot on the outside of the shoulder-band, commencing it near the end of the shoulder-band opposite the shoulder G, then gradually sinking it into the band as it approaches the shoulder, under which it passes, and is continued along the frictional surface of the spindle nearly to the nut end. The lower part of slot has places g g cut out to allow the oil or grease to flow freely from the ducts D D to the surface of the spindle. The length and width of the slide B are made to correspond with the slot, but are thinner, in order that it may pass freely into the opening when loaded with grease or other lubricating material without dislodging its load. The slide for hard lubricants may be simply a thin flat bar of steel or other stiff metal, such as shown in Fig. 6. When almost in place, the narrow end of the slide comes in contact with inclined plane a, slides over it until it reaches the bevel-angle b, which checks and prevents it from slipping out beyond the periphery of the spindle. The wedge d, now being turned down, crowds the outside end out even with the inside end, holding the slide securely in place and in line with the periphery of the spindle. The grease is displaced by this operation into the remaining space in the slot. Ducts D D are provided in the slide, so that a soft lubricant can also be used, and when the slide is contrived to serve this double purpose I make it of tin or other thin material, with flanged edges, which correspond in breadth to the depth of the slot, and the ducts D D may be fastened on the back side; or the slide may be made solid and ducts chiseled or bored out, as shown in Fig. 4. The ducts may be continued up through the shoulder-band H, coming out at $h\,h$. When the operator pours the lubricant into the ports $h\,h$, it runs down through the ports E E in upper side of slide into the ducts, discharging through the ports F F into notches $g\,g$, and is then diffused over the surface of the spindle. Therefore, when soft or fluid lubricant is used, it is not necessary to remove the slide or any part of wheel or axle. The finger-pull or handle N enables the operator to readily take a firm hold of the slide when handling the same. It may be an extension of the slide or detachable. The probes $c\,c$ are for quickly liberating the grease in the ducts should it become clogged. They are situated within the ducts, and may extend through the rear end of the slide. By working them to and fro with the lever $i$, or by any suitable means, they help to start the grease to flowing. The lever $d$, attached to the axle W at the rear end of the slide B, crowds out the rear end of the slide to place when the lever is turned down under it, thus bringing the rear end in line with its front end and even with the surface of the spindle, and it also serves as a key to keep the slide from working back. The spring $m$ prevents the wedge or lever $d$ from jarring out of place.

My invention is equally applicable to wrought-iron skeins or steel axles which are solid, and other details in construction may be varied without departing from the principle of the device.

What I claim, and wish to secure by Letters Patent, is—

1. In a vehicle-axle, a spindle provided with a slide or plug which fits within a groove, in combination with a wedge for holding said slide or plug in place, substantially as described and shown.

2. In a vehicle-axle, a spindle having a groove or slot provided with an inclined plane, $a$, bevel-angle $b$, and wedge $d$, in combination with a slide or plug such as shown and described.

3. In a vehicle-axle, a spindle provided with an approximately wedge-shaped slot, in combination with a slide or plug, substantially as shown and described.

4. In a vehicle-axle, a spindle having a groove or slot provided with an inclined plane and bevel-angle, in combination with a slide or plug, substantially as shown and described.

5. In a vehicle-axle, a spindle having a groove or slot, in combination with a slide provided with oil or grease ducts, substantially as shown and described.

6. In a vehicle-axle, a spindle having oil-ducts provided with probes such as shown, for the purpose of agitating the lubricant within said ducts, substantially as described and set forth.

7. In a vehicle-axle, a spindle having a slot or groove, in combination with a slide provided with ducts which are continued through the shoulder-band, in the manner shown and described.

8. In a vehicle-axle, a spindle having a slot or groove provided with a thin slide such as shown, whereby the same, when previously loaded with grease or lubricating material, will pass freely into the wheel without dislodging its load on the outside, but displacing it within the slot, substantially as shown and described with reference to Figs. 5, 6, and 9 of the drawings.

9. In a vehicle-axle, a spindle having a slot or groove, in combination with a slide which is held in place by the wedge $d$ and spring $m$, substantially as described and shown.

In testimony whereof I affix my signature in presence of two witnesses.

WARREN COLE, JR.

Witnesses:
 LEWIS HOSMER,
 E. G. CAINE.